(12) United States Patent
Roberts-Hoffman et al.

(10) Patent No.: US 10,447,659 B2
(45) Date of Patent: Oct. 15, 2019

(54) SHARING PROTECTED USER CONTENT BETWEEN DEVICES

(71) Applicant: Google Inc., Mountain View, CA (US)

(72) Inventors: Katie Leah Roberts-Hoffman, San Jose, CA (US); Alberto Martin Perez, Los Altos, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/059,250

(22) Filed: Mar. 2, 2016

(65) Prior Publication Data

US 2017/0257349 A1    Sep. 7, 2017

(51) Int. Cl.
| | |
|---|---|
| *H04L 9/00* | (2006.01) |
| *H04L 29/06* | (2006.01) |
| *G06F 16/182* | (2019.01) |
| *H04L 29/08* | (2006.01) |
| *H04W 4/08* | (2009.01) |

(52) U.S. Cl.
CPC ........ *H04L 63/0428* (2013.01); *G06F 16/183* (2019.01); *G06F 16/1834* (2019.01); *H04L 63/102* (2013.01); *H04L 67/104* (2013.01); *H04L 67/1061* (2013.01); *H04L 67/1087* (2013.01); *H04L 67/141* (2013.01); *H04L 67/16* (2013.01); *H04W 4/08* (2013.01)

(58) Field of Classification Search
CPC .................................................. H04L 63/0428
USPC ........................................................... 726/4
See application file for complete search history.

(56) References Cited

U.S. PATENT DOCUMENTS

| | | | |
|---|---|---|---|
| 8,457,651 B2 | 6/2013 | Forutanpour et al. | |
| 8,938,788 B2 | 1/2015 | McNeil et al. | |
| 8,966,601 B2 | 2/2015 | Green et al. | |
| 2003/0208595 A1 | 11/2003 | Gouge et al. | |
| 2006/0200570 A1* | 9/2006 | Stirbu ............... | G06F 17/30067 |
| | | | 709/230 |
| 2012/0185520 A1 | 7/2012 | Iarocci et al. | |
| 2012/0236788 A1 | 9/2012 | Maddali et al. | |
| 2014/0287818 A1 | 9/2014 | Chan et al. | |

(Continued)

OTHER PUBLICATIONS

International Search Report and Written Opinion from Internatonal Application No. PCT/US2016/068261, dated Mar. 8, 2017.

(Continued)

*Primary Examiner* — Alexander Lagor
*Assistant Examiner* — Syed M Ahsan
(74) *Attorney, Agent, or Firm* — Morgan, Lewis & Bockius LLP

(57) ABSTRACT

Aspects of the subject technology relate to systems and methods for sharing encrypted information among multiple devices. A peer-to-peer connection between a first computing device associated with a user account and a second computing device associated with the user account is established. Information associated with at least a portion of a file system of the second computing device may be received by the first computing device, where the portion of the file system comprises encrypted data. The portion of the file system of the second computing device may be mounted on the first computing device based on the received information.

20 Claims, 5 Drawing Sheets

(56) References Cited

U.S. PATENT DOCUMENTS

| | | | |
|---|---|---|---|
| 2015/0046995 A1* | 2/2015 | Yang | H04L 63/083 726/7 |
| 2015/0089075 A1* | 3/2015 | Strigeus | G06F 17/30321 709/231 |
| 2015/0140930 A1* | 5/2015 | Chen | H04B 5/00 455/41.1 |

OTHER PUBLICATIONS

"Ubuntu Manpage Repository" Canonical Ltd., retrieved from internet on May 30, 2018 at http://manpages.ubuntu/manpages/precise/man8/mount.8.html#contenttoc24, 35 pages.

International Preliminary Report on Patentability from PCT/US2016, 068261, dated May 30, 2018, 8 pages.

Australian ion Report from Australian Patent Application No. 2016396082, dated Sep. 5, 2018, 3 pages.

Canadian Office Action from Canadian Patent Application No. 3005635, dated Mar. 21, 2019, 3 pages.

* cited by examiner

SHARING PROTECTED USER CONTENT BETWEEN DEVICES

BACKGROUND

As computing devices become more mobile, users may carry more than one computing device. Users may have different data on different computing devices, and it may be difficult to access all of the data in one place. In some cases, a user may wish to access an application on one computing device from another computing device. In other cases, an application on one computing device may be saved in a different state than the application on another computing device. One way to synchronize data on different computing devices is through cloud-based syncing. However, cloud-based syncing requires an Internet connection and application support for cloud-based syncing. Furthermore, some data on the computing devices may be encrypted.

SUMMARY

Aspects of the subject technology relate to a computer-implemented method for sharing protected user content between devices. The method includes establishing a peer-to-peer connection between a first computing device associated with a user account and a second computing device associated with the user account. The method further includes receiving, by the first computing device from the second computing device via the established peer-to-peer connection, information associated with at least a portion of a file system of the second computing device, where the portion of the file system comprises encrypted data. The method further includes mounting, on the first computing device, the portion of the file system of the second computing device based on the received information.

Aspects of the subject also relates to a system. The system includes one or more processors and a non-transitory computer-readable medium including instructions stored therein, which, when processed by the one or more processors, cause the one or more processors to perform operations. The operation include receiving, by the first computing device from the second computing device via the established peer-to-peer connection, information associated with at least a portion of a file system of the second computing device, the portion of the file system comprising encrypted data. The operations also include mounting, on the first computing device, the portion of the file system of the second computing device based on the received information.

Aspects of the subject technology also relates to a non-transitory machine-readable medium including instructions stored therein, which when executed by a machine, cause the machine to perform operations. The operations include establishing a peer-to-peer connection between a first computing device associated with a user account and a second computing device associated with the user account. The operations also include receiving, by the first computing device from the second computing device via the established peer-to-peer connection, information associated with at least a portion of a file system of the second computing device, the portion of the file system comprising encrypted user-related data. The operations also include mounting, on the first computing device, the portion of the file system of the second computing device based on the received information.

It is understood that other configurations of the subject technology will become readily apparent to those skilled in the art from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

Figure 1:
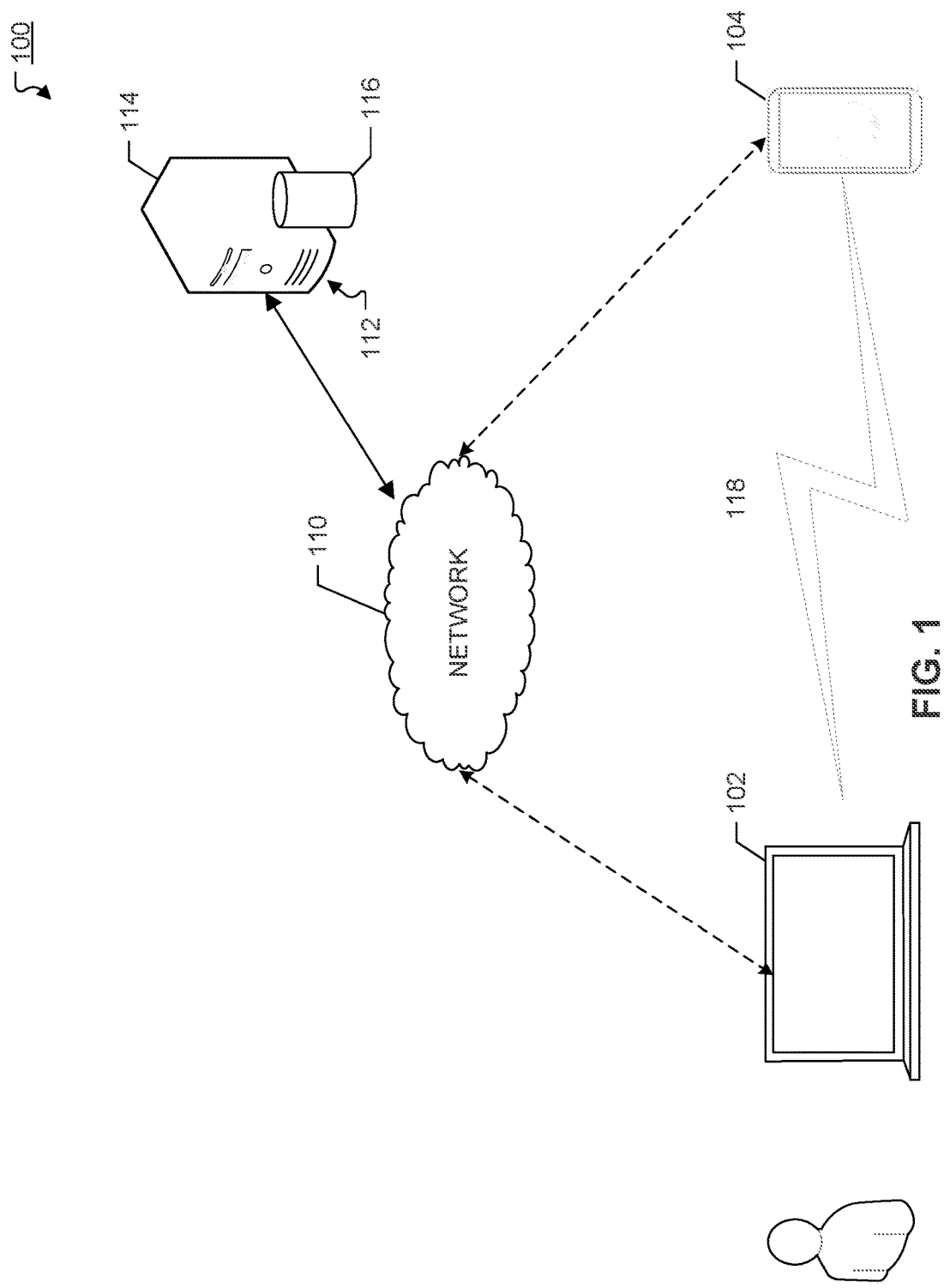
FIG. 1 illustrates an example network environment in accordance with various aspects of the subject technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details. In some instances, structures and components are shown in block diagram form in order to avoid obscuring the concepts of the subject technology.

The subject technology facilitates sharing encrypted information among multiple computing devices. As further explained below, a peer-to-peer connection may be formed between a first computing device and a second computing device. The subject technology may determine that the first computing device has permission to view at least a portion of a file system of the second computing device, where the portion of the file system of the second computing device includes encrypted data. The first computing device may receive information associated with at least the portion of the file system of the second computing device and may mount the portion of the file system. A user may be able to view at least the portion of the file system and access encrypted data from the second computing device on the first computing device. Accessing encrypted data from the second computing device may comprise viewing or interacting with files or applications in the file system on the first computing device through the peer-to-peer connection. A user may wish to view encrypted data from the second computing device on the first computing device in order to, for example, take advantage of a larger viewing screen, faster processing capacity, or longer battery life of the first computing device. As discussed herein, data that is encrypted may be selected for encryption by the user, or as a requirement of software (e.g., an operating system or application) operating on the second computing device.

According to various aspects, the first and second computing devices may be associated with a common user account. User account information may be stored locally on each of the first and the second computing devices and may be authenticated on each of the first and the second computing devices. For example, the common user account may be a user account that is associated with operating systems on the first and the second computing devices. The first and second computing devices may be associated with the common user account when user identification information and user authentication information associated with an operating system on the first computing device is the same as user identification information and user authentication information associated with an operating system on the second computing device. The user identification information may include, for example, a user identifier, and the user authentication information may include, for example, a user password associated with the user account. Authentication may be initiated by an operating system log-in page on each of the first and second computing devices. The subject technology may determine that the first computing device has permission to access encrypted data stored on the second computing device based at least partly on determining that common identification information and common user authentication information are being used on the first and the second computing devices.

In some cases, the common user account may be an online or cloud-based user account that is used to access various web services. Examples of web services include email, social network, operating system, web based applications, etc. Access to the web services may be granted through authentication of user account credentials by a server, for example. Authentication may be initiated by signing into the user account through, for example, a web portal, a web application, application log-in page, operating system log-in page, etc. As described below, authenticated user account credentials for one computing device may be used when establishing a peer-to-peer connection. Once the peer-to-peer connection between two devices is established, the first computing device may access encrypted data stored on the second computing device. In some aspects, the first computing device may use the encrypted data from the second computing device as if the files are stored locally on the first computing device.

FIG. 1 illustrates an example network environment 100 according to one or more implementations described herein. The network environment 100 includes first computing device 102 and second computing device 104. The first computing device 102 and the second computing device 104 may communicate with each other through a peer-to-peer connection 118. In some aspects, the network environment 100 may also comprise a server 112. The first computing device 102 and second computing device 104 may communicate with server 112 through a network 110. Server 112 can include one or more computing devices 114 (e.g., one or more servers) and data store 116.

The first computing device 102 and second computing device 104 may be systems or devices having a processor, a memory, and communication capability for exchanging data with other computing devices, including for example, server 112. In some aspects, the first computing device 102 and the second computing device 104 may have capabilities to display information and to receive user input on the respective computing devices. By way of example and not of limitation, computing devices can include a desktop computer, a laptop computer, a handheld computer, a tablet, a personal digital assistant (PDA), a cellular telephone, a network appliance, a camera, a smart phone, an enhanced general packet radio service (EGPRS) mobile phone, a media player, a navigation device, an email device, a game console, television, set-top box or a combination of any of these computing devices or other computing devices.

Figure 2:
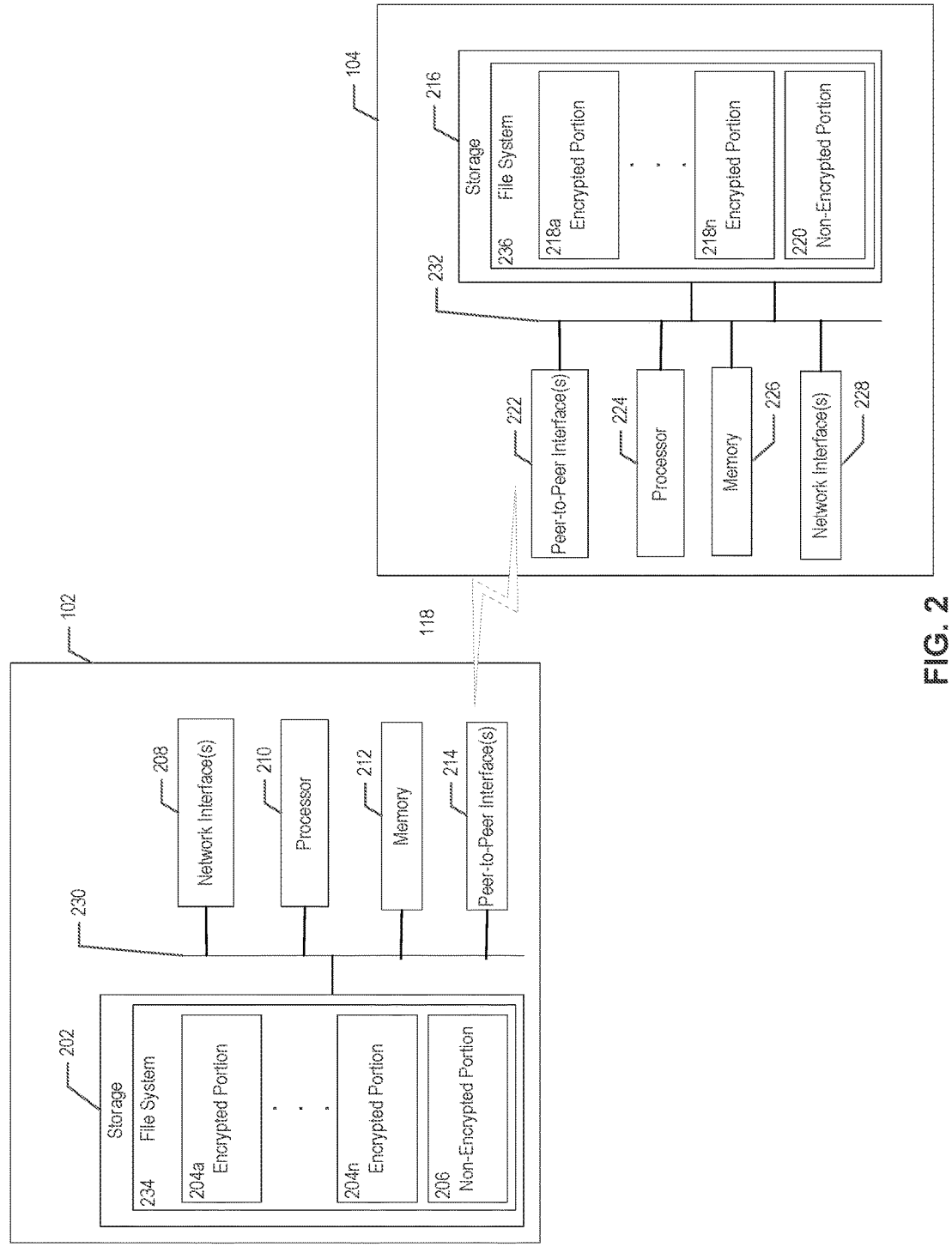
FIG. 2 illustrates example computing devices as shown in FIG. 1 in accordance with various aspects of the subject technology.

FIG. 2 shows first computing device 102 and second computing device 104 according to aspects of the subject technology. Not all of the components depicted in the figure may be used, and one or more implementations may include additional components not shown in the figure. Variations in the arrangement and type of the components may be made without departing from the scope of the subject technology. Additional components, different components, or fewer components may be provided.

The first computing device 102 may include processor 210, memory 212, network interface 208, peer-to-peer interface 214, bus 230, and storage 202. The second computing device 104 may include processor 224, memory 226, network interface 228, peer-to-peer interface 222, bus 232, and storage 216.

Processor 210 can be a single processor, a multi-core processor or multiple processors. Memory 212 may include a dynamic random-access memory (DRAM) and/or a read-only memory (ROM). Memory 212 may provide a temporary location to store data and instructions retrieved and processed by processor 210. Bus 230 may be used to transfer data between components, such as between storage 202 and processor 210. Bus 230 may use a wide variety of hardware components (wire, optical fiber, etc.) to establish a connection between components. Descriptions of processor 210, memory 212, and bus 230 may apply to processor 224, memory 226, and bus 232.

Storage 202 may include a non-volatile read-and-write memory that stores data and instructions that may be retrieved and processed by processor 210. For example, storage 202 may include magnetic, solid-state or optical media. An operating system (not pictured) installed on storage 202 may use file system 234 to store and retrieve data. The file system 234 may include encrypted portions 204a-204n and non-encrypted portion 206. Each of the encrypted portions 204a-204n and non-encrypted portion 206 may comprise data, files, and/or directories. Data in encrypted portions 204a-n may be encrypted using various encryption schemes, such as Advanced. Encryption Standard. In some cases, there may be different encrypted portions 204a-n, for each of registered users A-N, respectively, of device 102. Encrypted portion 204a may include user-related data. User-related data may include data created for, created by, and/or otherwise associated with the user, and may comprise the user's settings on the device 102, applications, photos, videos, documents, etc. Encrypted portions 204a-n may include non-user-related data such as tiles related to the operating system. In some implementations, user-related data may be stored in different encrypted portions in storage 202. For example, user A's videos may be stored in encrypted portion 204a and user A's applications may be stored in encrypted portion 204b. In some cases, some of the encrypted portions 204a-204n may be encrypted using different encryption schemes. Some user-related data may be stored in non-encrypted portion 206. Descriptions of storage 202, encrypted portions 204a-204n and non-encrypted portion 206 may apply to storage 216, encrypted portions 218a-218n and non-encrypted portion 220.

According to various implementations, computing devices 102 and 104 may be associated with a user account. In some cases, computing devices 102 and 104 each may be associated with multiple user accounts. Even when a computing device is associated with multiple different user accounts, there may be one user account currently logged into the computing device. For example, multiple users may have previously authenticated user account credentials on a computing device and/or logged into an operating system on the computing device, but there may be one user who is currently logged into the user account on the computing device.

Some of the data in storage 202 and 216 may be associated with a specific user account and may be accessed only when the user is currently signed into the corresponding user account on the computing device. For example, user A's identification information and user authentication information may be used to retrieve a key to decrypt and access encrypted portions of the file system 234 associated with user A. However, the key may not be usable to decrypt encrypted portions of the file system 234 associated with user B. In some cases, identification information and user authentication information may be used to generate the key. Encrypted portions 204*a-n* may also comprise an encrypted portion 204*c* that is associated with multiple users A-N. Encrypted portion 204*c* may comprise user-related data and other non-user-related data associated with users A-N and may be accessed by users A-N.

Returning to FIG. 1, the server 112 may be any system or device having a processor, a memory, and communications capability for exchanging data with other computing devices, including for example, the first computing device 102 and the second computing device 104. The server 112 may receive user identification information and user authentication information from each of the first computing device 102 and the second computing device 104. The server 112 may authenticate, for each of the first computing device 102 and the second computing device 104, respective user identification information with respective user authentication information and transmit user verification information to the respective computing device. User verification information may comprise information associated with whether the user identification information and the user authentication information received by the server 112 matches those stored in the server 112. User verification information may also comprise the date and time that the user identification information and the user credential information were verified and/or the date and time that the user verification information expires. A short duration between the verification time and the expiration time may provide additional security to the users by requiring more frequent authentication from the server 112.

Authentication may be done through, for example, looking up user authentication information associated with the received user identification information in a database and comparing the user authentication information in the database with the received user authentication information. In some example aspects, the server 112 can include a single computing device (e.g., computing device 114). In other implementations, the server 112 can represent more than one computing device working together to perform the actions of a computer server (e.g., server farm). Further, the server 112 can represent various forms of servers including, but not limited to, a web server, an application server, a proxy server, a network server, or a server farm.

In some aspects, the computing devices, including first computing device 102 and second computing device 104, may communicate with each other wirelessly through peer-to-peer interfaces 214 and 222 which may include digital signal processing circuitry. The first computing device 102 and the second computing device 104 may not need the Internet to form a peer-to-peer connection between the two devices. Peer-to-peer interfaces 214 and 222 may provide for communication under protocols such as Bluetooth, Near Field Communication (NFC), and/or Wi-Fi Direct.

Computing devices 102 and 104 may also communicate with server 112 wirelessly through network interfaces which may include digital processing circuitry. Network interfaces 208 and 228 may provide for communications under various modes or protocols, for example, Global System for Mobile communication (GSM) voice calls, Short Message Service (SMS), Enhanced Messaging Service (EMS) or Multimedia Messaging Service (MMS) messaging, Code Division Multiple Access (CDMA), Time Division Multiple Access (TDMA), Personal Digital Cellular (PDC), Wideband Code Division Multiple Access (WCDMA) CDMA2000, or General Packet Radio System (GPRS), etc. For example, the communication may occur through a radio-frequency transceiver (not shown).

In one or more implementations, the first computing device 102 may connect to the second computing device 104 by establishing the peer-to-peer connection 118. The first computing device 102 may receive information associated with a portion of the file system 236 on the second computing device 104. The first computing device 102 may mount portions of the file system 236 and display information associated with the portions of file system 236. The information associated with the portions of file system 236 may include filenames, creation/modification dates, file/directory hierarchies, etc. The user may interact with data stored on the encrypted portion of file system 236 as if the data is stored on the first computing device 102. Any changes made to the data may be directly stored on the encrypted portion of file system 236 on the second computing device 104.

In some aspects, network 110 can be a large computer network such as, for example, a local area network (LAN), wide area network (WAN), the Internet, a cellular network, or a combination thereof connecting any number of mobile clients, fixed clients, and servers. Further, network 110 can include, but is not limited to, any one or more of the following network topologies, including a bus network, a star network, a ring network, a mesh network, a star-bus network, tree or hierarchical network, and the like. In some aspects, communication between each client (e.g., first computing device 102 and second computing device 104) and server (e.g., server 112) can occur via a virtual private network (VPN), Secure Shell (SSH) tunnel, or other secure network connection. In some aspects, network 110 may further include a corporate network (e.g., intranet) and one or more wireless access points.

Figure 3:
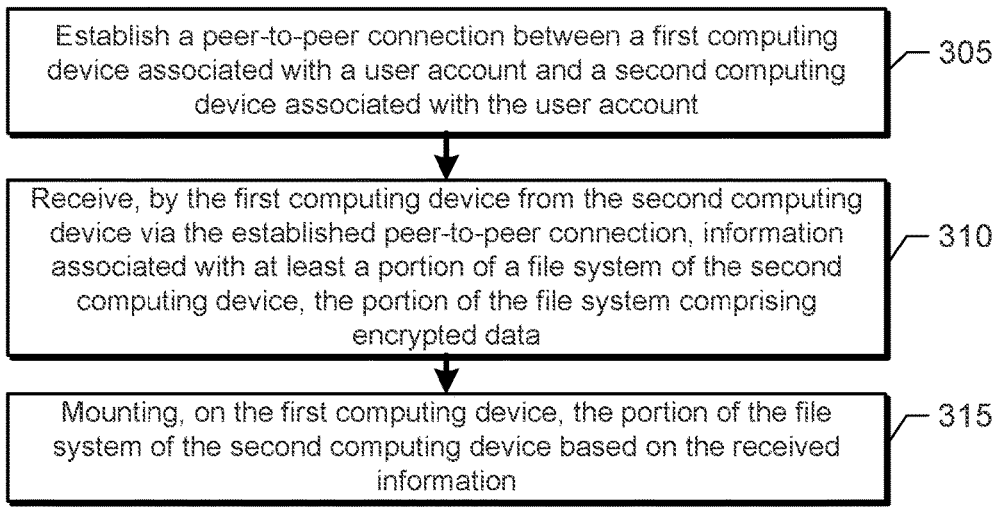
FIG. 3 shows a flowchart illustrating an example process in accordance with various aspects of the subject technology.

FIG. 3 shows a flowchart illustrating an example process 300 for accessing encrypted information on the second computing device from the first computing device, in accordance with various aspects of the subject technology. The steps of the process 300 do not need to be performed in the order shown. It is understood that the depicted order is an illustration of one or more example approaches, and the subject technology is not meant to be limited to the specific order or hierarchy presented. The steps can be rearranged, and/or two or more of the steps can be performed simultaneously.

In block 305 of FIG. 3, a peer-to-peer connection between a first computing device 102 associated with a user account and a second computing device 104 associated with the user account is established. According to aspects of the subject technology, the peer-to-peer connection may be established between the first computing device 102 and the second computing device 104 without an Internet connection, and thus a connection with the server 112 through the network 110 is not required for steps 305, 310, and 315. The peer-to-peer connection may be any type of connection between the two computing devices using wireless and/or wired media and protocols. The peer-to-peer connection may be made using Bluetooth, NFC, Wi-Fi Direct, etc. In some cases, the first computing device 102 and the second computing device 104 may use the Internet to establish a connection through, for example, Secure Shell (SSH) protocol.

The first computing device 102 and second computing device 104 may automatically establish a peer-to-peer connection 118 when the distance between the two devices is within a threshold distance. The threshold distance may vary depending on the range/limits of the systems (e.g., transmitter, receiver, radio, etc) of the peer-to-peer interfaces used for the connection. For example, the first computing device 102 may periodically broadcast inquiries at one or more different frequencies until the first computing device 102 receives a response from the second computing device 104. The inquiry may comprise a first identifier associated with the first computing device 102. The second computing device 104 may scan for incoming inquiries and receive the inquiry from the first computing device 102 when the distance between the two devices is within the threshold distance. The second computing device 104 may transmit a response comprising a second identifier associated with the second computing device 104 to the first computing device 102. Using the first and the second identifiers, the first and the second computing devices may establish a short-range connection through for example, Bluetooth pairing.

Once the peer-to-peer connection 118 has been established, the first computing device 102 and the second computing device 104 may further determine (1) whether the first computing device 102 and the second computing device 104 support the subject technology, and (2) whether the active user account of the first computing device 102 has permission to access the portion of file system 236 of the second computing device 104. These determinations may be based on exchanging communication data. Communication data may include, for example, file system information and/or user account information. Communication data may be exchanged as part of the inquiry and response exchange described above to establish the peer-to-peer connection 118. In one or more implementations, the first computing device 102 and the second computing device 104 may exchange communication data via the peer-to-peer connection 118.

For example, the first computing device 102 and second computing device 104 may exchange communication data comprising information associated with whether the first computing device 102 and the second computing device 104 support the subject technology. The second computing device 104 may only grant access of its file system 236 when the second computing device 104 determines that the first computing device 102 supports the subject technology. The second computing device 104 may determine that the first computing device 102 supports the subject technology when the second computing device 104 determines that the first computing device 102 supports protocols that allow data from file system 236 of the second computing device 104 to be used natively on the first computing device 102. An operating system on the first computing device 102 may only support one type of file system. Accordingly, determining a type and/or version of an operating system may determine support for the subject technology. In one or more implementations, the first computing device 102 may receive information associated with file system 236 from the second computing device 104 and may determine whether the file system 236 is supported on the first computing device 102. In another implementation, the first computing device 102 may transmit communication data comprising supported types of file systems. The second computing device 104 may retrieve information about file system 236, and may determine whether the file system 236 is supported on the first computing device 102.

Once the determination is made that the first computing device 102 and the second computing device 104 support the subject technology, the first computing device 102 and second computing device 104 may further exchange communication data comprising user account information to determine whether the first computing device 102 has proper permission to access information stored on the second computing device 104. User account information may comprise, for example, user identification information, user authentication information and user verification information. In some implementations, the exchanged user account information may be an encrypted version of the user account information or a certificate that can be authenticated only by another computing device associated with a common user account. The first computing device 102 may receive user account information from the second computing device 104 and compare the received user account information with user account information stored on the first computing device.

Although the establishment of the peer-to-peer connection 118 and the exchange of communication data have been described sequentially, in some implementations, the first computing device 102 and the second computing device 104 may exchange communication data during the establishment of the peer-to-peer connection 118. The peer-to-peer connection 118 between the first computing device 102 and the second computing device 104 may be completed based on the communication data.

In some cases, the computing devices 102 and 104 may be associated with multiple user accounts. Even when a computing device is associated with multiple different user accounts, one user account may be signed into the computing device at any given time. Some of the data in file system 234 and 226 may be associated with a specific user account and may be accessed only when the user is currently signed into the corresponding user account on the computing device.

For example, a first user may be signed into a corresponding first user account on the first computing device 102. The second computing device 104 may be associated with the first user account and a second user account of a second user. In addition, the file system 236 may comprise a first encrypted portion 218a associated with the first user account and a second encrypted portion 218b associated with the second user account, where the first encrypted portion 218a and the second encrypted portion 218b comprise encrypted data. Normally, encrypted data in the first encrypted portion 218a may be only accessible on the second computing device 104 when a user is currently signed into the first user account and encrypted data in the second encrypted portion 218b may be only accessible on the second computing device 104 when a user is currently signed into the second user account. However, the subject technology may allow the first computing device 102, which is signed into the first user account, to access the first encrypted portion 218a even when the second computing device 104 is currently signed into the second user account. User account information associated with the first user account stored in the second computing device 104 may be used to verify that the first computing device 102 may access encrypted data in the first portion of storage 216.

In some implementations, the first computing device 102 may make the comparison of user account information from received user account information with user account information stored in the first computing device 102 when user account credentials on the first computing device 102 and the second computing device 104 were authenticated within a predetermined threshold period of time. The server 112 may authenticate user account information when a user signs into the user account through, for example, a web portal, a web application, application log-in page, operating system sign in page, etc. For example, the user may sign into the user account on the first computing device 102. The first computing device 102 may store user account information comprising first timestamp information indicating when the user account was authenticated by the server 112. Similarly, the second computing device 104 may also store user account information comprising second timestamp information indicating when the user account was authenticated by the server 112. When the first computing device 102 receives user account credential information from the second computing device 104, the user account credential information may comprise the second timestamp information. The first computing device 102 may make the comparison only when the user information was authenticated by the server 112 within a predetermined period of time (for example, 30 days). Similarly, the second computing device 104 may also compare user account credential information from the first computing device 102 with user account information stored in second computing device 104.

Figure 5A:
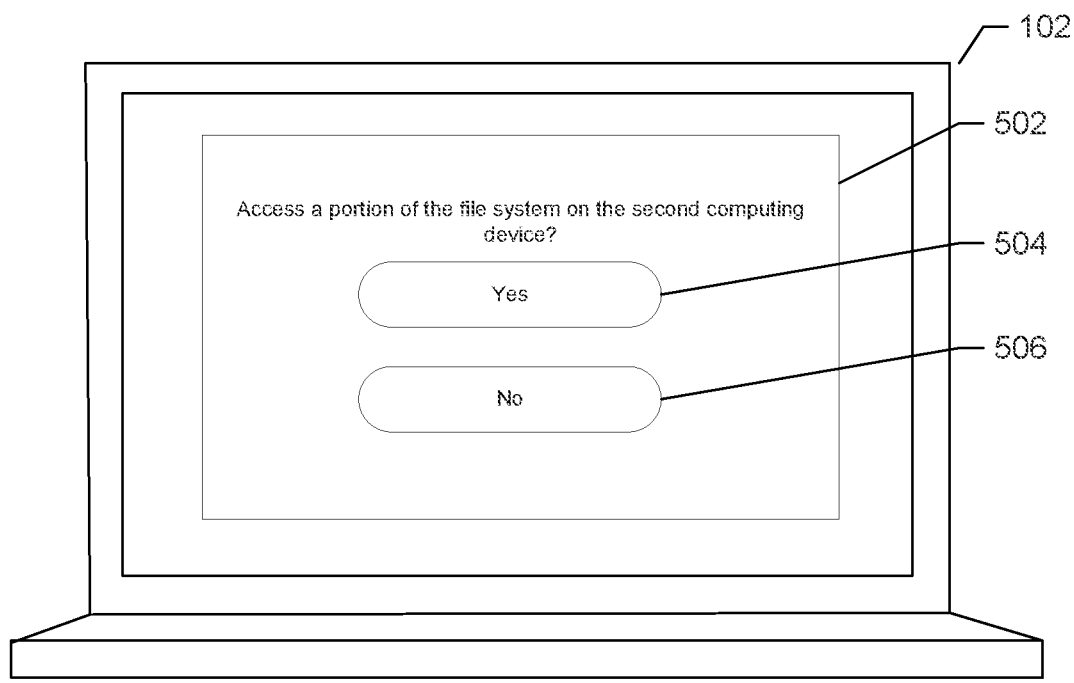
FIGS. 5A and 5B provide example screens that may be presented to a user.

In some cases, users may wish to have additional verification before granting access to encrypted portions of file systems of their computing devices. This may reduce the likelihood that an unauthorized user accesses sensitive material stored on the encrypted portions of the file system. For example, the first computing device 102 may display a first graphical user interface 502 as shown in FIG. 5A to prompt the user to verify that the user intends to access a portion of the file system on the second computing device 104. User interface 502 may have graphical user elements 504 and 506 to allow the user to indicate whether the user wishes to access the portion of the file system on the second computing device 104. The first computing device 102 may receive a user input associated with graphical user element 502 which indicates user permission to establish the peer-to-peer connection between the first computing device 102 and the second computing device 104.

Figure 5B:
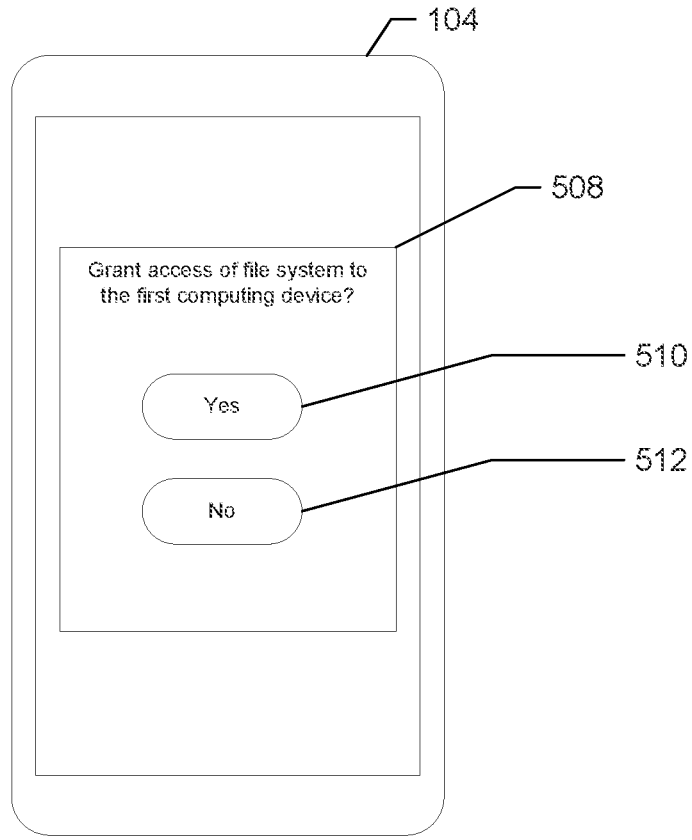

The second computing device 104 may receive information from the first computing device 102 and, in response, display a second graphical user interface 508 as shown in FIG. 5B to verify that the user intends to grant permission to access the portion of the file system on the second computing device 104. User interface 508 may have graphical user elements 510 and 512 to allow the user to indicate whether the user wishes to grant permission. The second computing device 104 may receive a user input associated with graphical user element 510 which may indicate user permission to grant access. In response to receiving the user input, the second computing device 104 may allow access to the corresponding portion of the file system 236. In some implementations, the first computing device 102 may send a request to establish the peer-to-peer connection after it receives information associated with the user permission from the second computing device 104. In some implementations, the user may configure the first computing device 102 and second computing device 104 to continue to share access to their respective file systems while the computing device 102 and second computing device 104 are within a radius of permitting the peer-to-peer connection to remain intact, or automatically reconnect to one another over a peer-to-peer connection whenever the computing device 102 and second computing device 104 subsequently come into proximity with one another.

In block 310 of FIG. 3, information associated with at least a portion of a file system of the second computing device 104 is received by the first computing device 102 from the second computing device 104 via the established peer-to-peer connection. The information associated with at least a portion of the file system of the second computing device 104 may comprise metadata that is used by an operating system of the first computing device 102 to read and write to storage 216 of the second computing device 104. The metadata characterizes the file system and its contents to facilitate access, and may include, for example, file names, file types, and directory structures. The metadata may be used by the first computing device 102 to mount the file system of the second computing device 104. In cases where the second computing device 104 is associated with multiple user accounts, the second computing device 104 may receive user account information associated with an active user account on the first computing device 102. In certain aspects, both the first computing device 102 and the second computing device 104 can verify that the user account is active, and an authentication information verifying the active status of the account can be stored locally on each device such that subsequent logins do not require access to the network 110. The second computing device 104 may transmit only information associated with a portion of the file system associated with the active user account.

The storage 216 may comprise files related to the operating system of the second computing device 104 and may further comprise user-related data. User-related data may include data that are non-essential to the operation of the operating system on the second computing device 104. Many of the user-related data may be created or obtained by the user and may include, for example, photographs, videos, applications, and etc. Instead of accessing all the files in storage 216, a user may wish to access only user-related data. In some implementations, at least the portion of the file system may comprise user related data. In other implementations, at least the portion of the file system may comprise user related data and files related to the operating system of the second computing device 104.

In block 315 of FIG. 3, the portion of the file system of the second computing device 104 is mounted on the first computing device 102 based on the received information. Once the portion of the file system of the second computing device 104 is mounted, a user may interact with files or data stored on at least the portion of the file system as if the data were stored on storage 202 of the first computing device 102. The first computing device 102 may be able to access the portion of the file system of the second computing device 104, and may interact with data on the file system as illustrated in FIG. 3.

Figure 4:
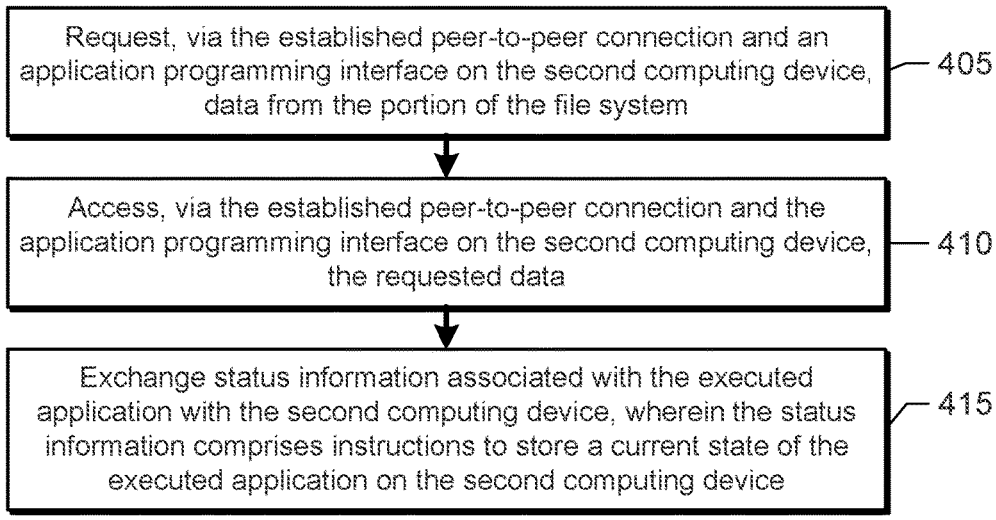
FIG. 4 shows a flowchart illustrating an example process in accordance with various aspects of the subject technology.

FIG. 4 shows a flowchart illustrating an example process 400 for accessing data on the storage 216, in accordance with various aspects of the subject technology. The steps of the process 400 do not need to be performed in the order shown. It is understood that the depicted order is an illustration of one or more example approaches, and the subject technology is not meant to be limited to the specific order or hierarchy presented. The steps can be rearranged, and/or two or more of the steps can be performed simultaneously.

In block 405 of FIG. 4, data from a portion of the file system may be requested, via the established peer-to-peer connection. In some cases, the second computing device 104 may have an application programming interface associated with an operating system and/or application executing on the computing device that allows the first computing device 102 to access various functions or routines that assist in the exchange of information between the first computing device 102 and the second computing device 104. Once the portion of the file system of the second computing device 104 is mounted on the first computing device 102, the user may view the files or data stored on the file system of the second computing device 104 on the first computing device 102. The user may select one or more files to access through, for example, interacting with a graphical user interface representing the mounted portion of the file system of the second computing device 104.

In block 410 of FIG. 4, the requested data is accessed via the established peer-to-peer connection. As mentioned previously, at least the portion of the file system may comprise encrypted data. Data may be encrypted, for example, by using Advanced Encryption Standard. Without a corresponding key associated with the encryption, the first computing device 102 may not be able to access the requested data.

In one or more implementations, the first computing device 102 may access decrypted versions of the requested data on second computing device 104. For example, the first computing device 102 may transmit a request for data stored in encrypted portion 218a. The second computing device 104 may receive the request for the data from the first computing device 102. Since the second computing device 104 already determined that the first computing device 102 has permission to view the encrypted portion 218a, the second computing device 104 may provide access to the encrypted portion 218a without further authentication. This may involve reading the data from encrypted portion 218a and loading the data onto memory 226. The second computing device 104 may decrypt the encrypted data that is loaded onto the memory 226 using a decryption key stored in association with the user account information in storage 202. In another implementation, requests to access data stored in portion 218a may be transmitted by the first computing device 102 along with the user account information. Every time the second computing device 104 receives the request to access data stored in encrypted portion 218a from the first computing device 102, the second computing device 104 may authenticate user account information received from the first computing device 102.

Once the data have been decrypted, the second computing device 104 may transmit the decrypted information to the first computing device 102 via the peer-to-peer connection 118. The first computing device 102 may receive the decrypted data and load the data onto memory 212. The first computing device 102 may access decrypted versions of the requested data and may modify the data as if the data was stored natively in storage 202. Normally, it may be undesirable to allow a remote device to access encrypted data; however, the subject technology verifies that an active user account on the first computing device 102 has permission to access encrypted data on the second computing device 104 as outlined above. Given such verification and the use of peer-to-peer connections, the connection between the first computing device 102 and the second computing device 104 may be less vulnerable to unauthorized access of encrypted data.

In another implementation, instead of decrypting the data as described above, the second computing device 104 may transmit encrypted data from the encrypted portion 218a to the first computing device 102. The first computing device may receive the encrypted data and decrypt the data using a key. In some cases, the key may be generated in the first computing device 102 based on user identification information and user authentication information received from the second computing device 104. In other cases, the key may be sent, at another time, by the second computing device 104 and the first computing device 102 may receive the key.

For example, the second computing device 104 may load onto memory 226 the encrypted data from encrypted portion 218a and a corresponding key associated with the encrypted data. The second computing device 104 may transmit the encrypted data to the first computing device 102. The first computing device 102 may receive the encrypted data through the peer-to-peer connection. The first computing device 102 may generate the corresponding key based on user identification information and user authentication information received from the second computing device 104. The first computing device 102 may load the received encrypted data and the key to memory 212. When the first computing device 102 receives indication from the user to view or access encrypted data, the first computing device 102 may use the key to decrypt the portion of the requested data so that the user may view or modify the data.

In some cases, the requested data may comprise an application and accessing the requested data may comprise executing the requested application on the second computing device 104. The user may execute applications stored on the second computing device 104. This may allow the user to interact with the application as if the application were stored on the first computing device 102.

In block 415 of FIG. 4, the status information associated with the executed application is exchanged with the second computing device 104, where the status information comprises instructions to store a current state of the executed application on the second computing device 104. In some cases, the application may need to store the updated state of the application. The first computing device 102 may transmit, via the peer-to-peer connection, the status information to the second computing device 104. The second computing device 104 may receive the status information and store the state information in storage 216. If the executed application was originally encrypted, then the second computing device 104 may also encrypt the updated state information. If the executed application was not originally encrypted, then the second computing device 104 may store the updated state information without encryption.

For example, user A may have a first computing device 102 (i.e. a laptop) and a second computing device 104 (i.e. a smartphone). During a commute on the train or a bus, the user A may wish to access a gaming application on a more portable device like second computing device 104. The gaming application may be stored in encrypted portion 218a of the second computing device 104. The encrypted portion 218a may be encrypted with an encryption scheme and may be associated with a key used for decryption. When the user signs into the second computing device 104 and executes the gaming application, the processor 224 may access the key associated with the encryption and decrypt the gaming application for execution. The user A may save any progress on the encrypted portion 218*a*.

Once the user A returns home, the user A may wish to utilize a device with a larger screen such as the first computing device 102 to access the gaming application. Traditionally, the user A may need to have the gaming application also installed on the first computing device 102 and the gaming application may need to support cloud syncing so that the user may use the first computing device 102 to continue from where the user left off on the second computing device 104. However, according to the subject technology, the user A may access and execute the gaming application on the second computing device 104 as if it were on the first computing device 102 without the need to install the gaming application on the first computing device 102.

The peer-to-peer connection between the first computing device 102 and the second computing device 104 may be established and the encrypted portion 218*a* may be mounted on the first computing device 102 according to the method described above. The user A may able to view, using the first computing device 102, the files stored in the encrypted portion 218*a*. In response to detecting user selection of the gaming application, the first computing device 102 may transmit a request to the second computing device 104 for the gaming application stored in encrypted portion 218*a*. The second computing device 104 may receive the request and provide the decrypted gaming application to the first computing device 102. The first computing device 102 may load the decrypted gaming application onto memory 212 for execution. During the execution of the gaming application, the first computing device 102 may determine that status information may need to be stored. The first computing device 102 may make the determination based on user input to save the current status or may be programmed to save status information after a predetermined amount of time.

The first computing device 102 may transmit status information to the second computing device 104. The second computing device 104 may receive the status information and may update the gaming application with the status information. The second computing device 104 may then encrypt and store the updated gaming application in the encrypted portion 218*a*.

Figure 6:
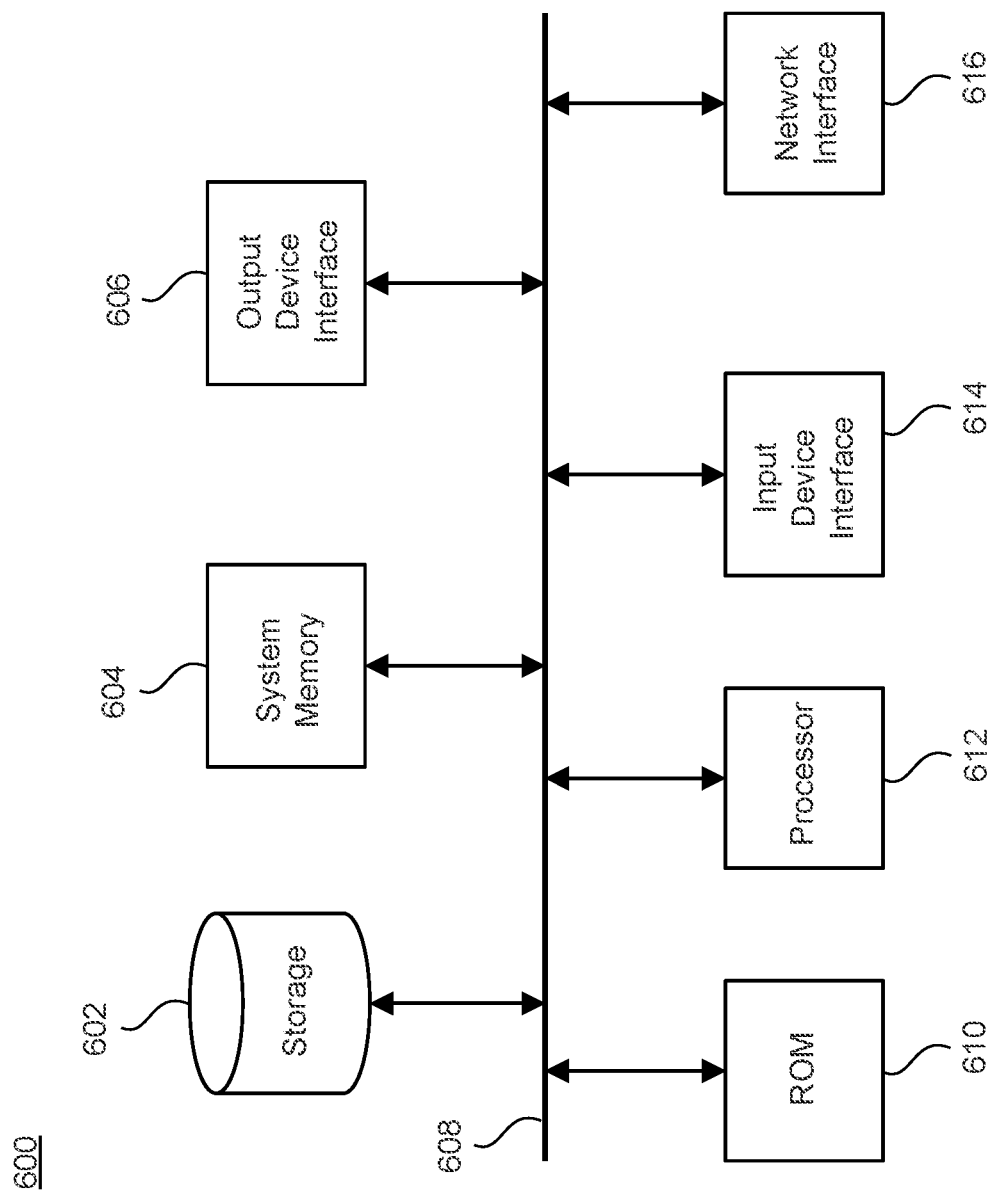
FIG. 6 conceptually illustrates an example electronic system with which some implementations of the subject technology can be implemented.

FIG. 6 conceptually illustrates an example electronic system with which some implementations of the subject technology can be implemented. Electronic system 600 can be a computer, phone, PDA, or any other sort of electronic device. Such an electronic system includes various types of computer readable media and interfaces for various other types of computer readable media. Electronic system 600 includes a bus 608, processing unit(s) 612, a system memory 604, a read-only memory (ROM) 610, a permanent storage device 602, an input device interface 614, an output device interface 606, and a network interface 616.

Bus 608 collectively represents system, peripheral, and chipset buses that communicatively connect the numerous internal devices of electronic system 600. For instance, bus 608 communicatively connects processing unit(s) 612 with ROM 610, system memory 604, and permanent storage device 602.

From these various memory units, processing unit(s) 612 retrieves instructions to execute and data to process in order to execute the processes of the subject disclosure. The processing unit(s) can be a single processor or a multi-core processor in different implementations.

ROM 610 stores static data and instructions that are needed by processing unit(s) 612 and other modules of the electronic system. Permanent storage device 602, on the other hand, is a read-and-write memory device. This device is a non-volatile memory unit that stores instructions and data even when electronic system 600 is off. Some implementations of the subject disclosure use a mass-storage device (for example, a magnetic or optical disk and its corresponding disk drive) as permanent storage device 602.

Other implementations use a removable storage device (for example, a floppy disk, flash drive, and its corresponding disk drive) as permanent storage device 602. Like permanent storage device 602, system memory 604 is a read-and-write memory device. However, unlike storage device 602, system memory 604 is a volatile read-and-write memory, such as a random access memory. System memory 604 stores some of the instructions and data that the processor needs at runtime. In some implementations, the processes of the subject disclosure are stored in system memory 604, permanent storage device 602, or ROM 610. For example, the various memory units include instructions for displaying web pages, processing user entries to the web pages, and generating URLs, in accordance with some implementations. From these various memory units, processing unit(s) 612 retrieves instructions to execute and data to process in order to execute the processes of some implementations.

Bus 608 also connects to input and output device interfaces 614 and 606. Input device interface 614 enables the user to communicate information and select commands to the electronic system. Input devices used with input device interface 614 include, for example, alphanumeric keyboards and pointing devices (also called "cursor control devices"). Output device interfaces 606 enables, for example, the display of images generated by the electronic system 600 output devices used with output device interface 606 include, for example, printers and display devices, for example, cathode ray tubes (CRT) or liquid crystal displays (LCD). Some implementations include devices, for example, a touchscreen that functions as both input and output devices.

Finally, as shown in FIG. 6, bus 608 also couples electronic system 600 to a network (not shown) through a network interface 616. In this manner, the computer can be a part of a network of computers (for example, a local area network (LAN), a wide area network (WAN), or an Intranet, or a network of networks, for example, the Internet. Any or all components of electronic system 600 can be used in conjunction with the subject disclosure.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example, microprocessors, storage, and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example, is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example, application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration nay apply to all configurations, or one or more configurations. A phrase such as a configuration may refer to one or more configurations and vice versa.

What is claimed is:

1. A computer-implemented method, comprising:
    establishing an ad hoc peer-to-peer connection between a first computing device associated with a first user account and a second computing device associated with the first user account;
    receiving, by the first computing device from the second computing device via the established peer-to-peer connection, information associated with at least a portion of a file system of the second computing device, the portion of the file system comprising encrypted data stored on the second computing device; and
    mounting, on the first computing device, the portion of the file system of the second computing device based on the received information and on the first computing device being currently signed into the first user account such that, when mounted, the encrypted data is decrypted on the second device and a decrypted version of the encrypted data is made available on the second computing device to the first computing device while the portion of the file system is mounted, wherein a second portion of the file system is associated with a second user account different than the first user account and is not accessible to the first user account, and wherein the mounted portion of the file system is not accessible to the second user account; and
    accessing, by the first computing device while the file system is mounted, the decrypted version on the second computing device.

2. The method of claim 1, further comprising:
    exchanging communication data with the second computing device; and
    determining, by the first computing device and based on the exchanged communication data, that the portion of the file system of the second computing device is mountable on the first computing device,
    wherein the received information associated with the at least the portion of the file system of the second computing device is based on the exchanged communication data.

3. The method of claim 2, wherein the exchanged communication data comprise user account information and the method further comprises determining that the first computing device and the second computing device are associated with the first user account based on user account information.

4. The method of claim 3, further comprising:
    receiving, on the first computing device, a first indication of user permission to establish the peer-to-peer connection between the first computing device and the second computing device,
    wherein the exchanged communication data further comprise information associated with the first indication of user permission and wherein the received information associated with the at least the portion of the file system of the second computing device is based on the exchanged communication data and a second indication of user permission to connect to the first computing device from the second computing device.

5. The method of claim 1, further comprising:
    requesting, via the established peer-to-peer connection and an application programming interface on the second computing device, data from the portion of the file system; and
    accessing, via the established peer-to-peer connection and the application programming interface on the second computing device, the requested data.

6. The method of claim 5, wherein the requested data comprises an application, and wherein accessing the requested data comprises executing the requested application on the second computing device.

7. The method of claim 6, further comprising:
    exchanging status information associated with the executed application with the second computing device, wherein the status information comprises instructions to store a current state of the executed application on the second computing device.

8. The method of claim 1, wherein the peer-to-peer connection is established through one of: Bluetooth, NFC, or Wi-Fi Direct.

9. A system, comprising:
    one or more processors; and
    a non-transitory computer-readable medium comprising instructions stored therein, which when executed by the one or more processors, cause the one or more processors to perform operations comprising:
        establishing an ad hoc peer-to-peer connection between a first computing device associated with a first user account and a second computing device associated with the first user account;
        receiving, by the first computing device from the second computing device via the established peer-to-peer connection, information associated with at least a portion of a file system of the second computing device, the portion of the file system comprising encrypted data stored on the second computing device; and
        mounting, on the first computing device, the portion of the file system of the second computing device based on the received information and on the first computing device being currently signed into the first user account such that, when mounted, the encrypted data is decrypted on the second device and a decrypted version of the encrypted data is made available on the second computing device to the first computing device while the portion of the file system is mounted, wherein a second portion of the file system is associated with a second user account different than the first user account and is not accessible to the first user account, and wherein the mounted portion of the file system is not accessible to the second user account; and accessing, by the first computing device while the file system is mounted, the decrypted version on the second computing device.

10. The system of claim 9, wherein the first computing device is currently signed into the first user account and the second computing device is currently signed into the second user account, and wherein the portion of the file system comprises data associated with the first user account.

11. The system of claim 10, wherein the instructions, when executed by the one or more processors, cause the one or more processors to perform operations further comprising:

exchanging communication data with the second computing device; and determining, by the first computing device and based on the exchanged communication data, that the portion of the file system of the second computing device is mountable on the first computing device, wherein the received information associated with the at least the portion of the file system of the second computing device is based on the exchanged communication data.

12. The system of claim 11, wherein the exchanged communication data comprise first user account information and the operations further comprises determining that the first computing device and the second computing device are associated with the first user account based on first user account information.

13. The system of claim 12, wherein the instructions, when executed by the one or more processors, cause the one or more processors to perform operations further comprising:

receiving, on the first computing device, a first indication of user permission to establish the peer-to-peer connection between the first computing device and the second computing device, wherein the exchanged communication data further comprise information associated with the first indication of user permission and wherein the received information associated with the at least the portion of the file system of the second computing device is based on the exchanged communication data and a second indication of user permission to connect to the first computing device from the second computing device.

14. The system of claim 9, wherein the instructions, when executed by the one or more processors, cause the one or more processors to perform operations further comprising:

requesting, via the established peer-to-peer connection and an application programming interface on the second computing device, data from the portion of the file system; and accessing, via the established peer-to-peer connection and the application programming interface on the second computing device, the requested data.

15. The system of claim 14, wherein the requested data comprise an application, and wherein accessing the requested data comprises executing the requested application on the second computing device.

16. The system of claim 15, wherein the instructions, when executed by the one or more processors, cause the one or more processors to perform operations further comprising:

exchanging status information associated with the executed application with the second computing device, wherein the status information comprises instructions to store a current state of the executed application on the second computing device.

17. A non-transitory machine-readable medium comprising instructions stored therein, which when executed by a machine, cause the machine to perform operations comprising:

exchanging, by a first computing device, communication data with a second computing device;

determining, by the first computing device and based on the exchanged communication data, that the second computing device supports a protocol for establishing an ad hoc peer-to-peer connection;

establishing the ad hoc peer-to-peer connection between the first computing device and the second computing device;

receiving, by the first computing device from the second computing device via the established peer-to-peer connection, information associated with at least a portion of a file system of the second computing device, the portion of the file system comprising encrypted user-related data stored on the second computing device; and mounting, on the first computing device, the portion of the file system of the second computing device based on the received information such that, when mounted, the encrypted data is decrypted on the second device and a decrypted version of the encrypted data is made available on the second computing device to the first computing device while the portion of the file system is mounted, wherein the mounted portion of the file system is associated with a first user account and a second portion of the file system is associated with a second user account different than the first user account and the second portion is not accessible to the first user account, wherein the mounted portion of the file system is not accessible to the second user account, and wherein the mounting of the mounted portion of the file system is based on the first computing device being currently signed into the first user account; and accessing, by the first computing device while the file system is mounted, the decrypted version on the second computing device.

18. The non-transitory machine-readable medium of claim 17, wherein the instructions, when executed by one or more processors, cause the one or more processors to perform operations further comprising:

determining, by the first computing device and based on the exchanged communication data, that the portion of the file system of the second computing device is mountable on the first computing device, wherein the received information associated with the at least the portion of the file system of the second computing device is based on the exchanged communication data.

19. The non-transitory machine-readable medium of claim 17, wherein the instructions, when executed by one or more processors, cause the one or more processors to perform operations further comprising:

requesting, via the established peer-to-peer connection and an application programming interface on the second computing device, data from the portion of the file system; and accessing, via the established peer-to-peer connection and the application programming interface on the second computing device, the requested data, wherein accessing the requested data comprises executing a requested application on the second computing device.

20. The non-transitory machine-readable medium of claim 19, wherein the instructions, when executed by one or more processors, causing the one or more processors to perform operations further comprising:

exchanging status information associated with the executed application with the second computing device, wherein the status information comprises instructions to store a current state of the executed application on the second computing device.

* * * * *